United States Patent
Carney

[11] 3,781,906
[45] Dec. 25, 1973

[54] MULTIPLE DAY RECORDING CHART PACK
[75] Inventor: Murray C. Carney, Springfield, Ill.
[73] Assignee: Sangamo Electric Company, Springfield, Ill.
[22] Filed: June 28, 1971
[21] Appl. No.: 157,589

[52] U.S. Cl. .............................................. 346/137
[51] Int. Cl. ......................................... G01d 15/32
[58] Field of Search ............................. 346/137, 24

[56] References Cited
UNITED STATES PATENTS
3,631,516  12/1971  Puchik ............................... 346/137

Primary Examiner—Joseph W. Hartary
Attorney—John A. Dienner et al.

[57] ABSTRACT

A multiple day chart pack for use with tachographs and the like which includes a plurality of stacked charts each of which has an inner disc portion detachably secured to an outer portion through breakable ties. The ties of each chart in the pack are positioned to require equal tie severing torque between successive charts. The tie circle of each chart in the pack is greater than the diameter of the tie circle of the next preceding chart to preclude restraint or interference with movement of a chart axially over the inner disc portions of the next preceding charts after recording thereon.

15 Claims, 8 Drawing Figures

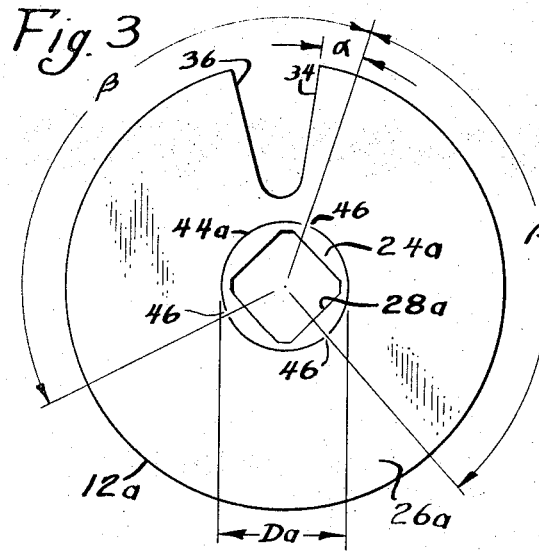
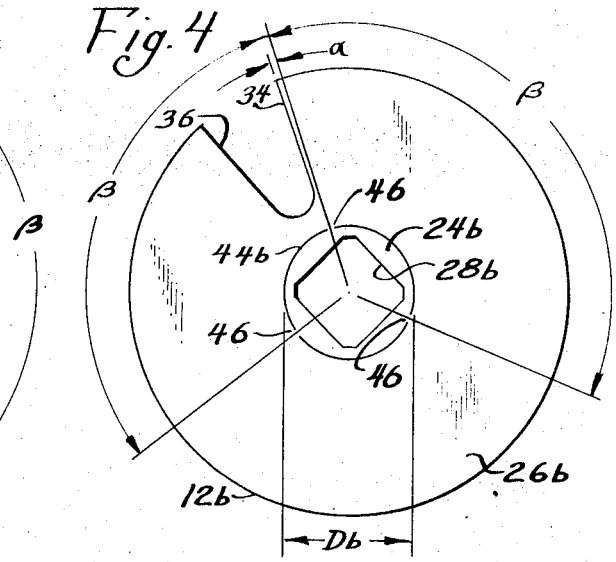
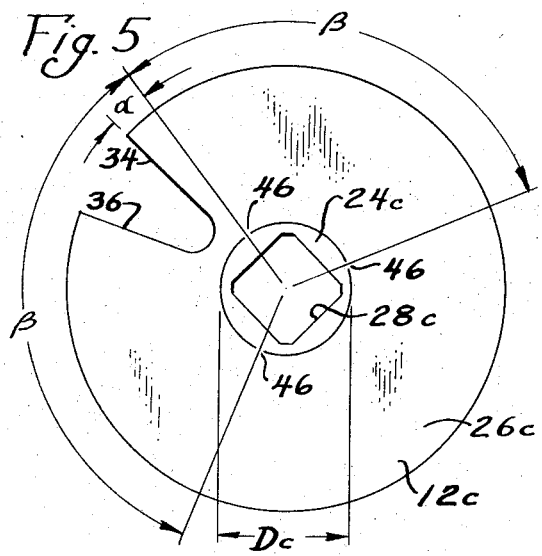
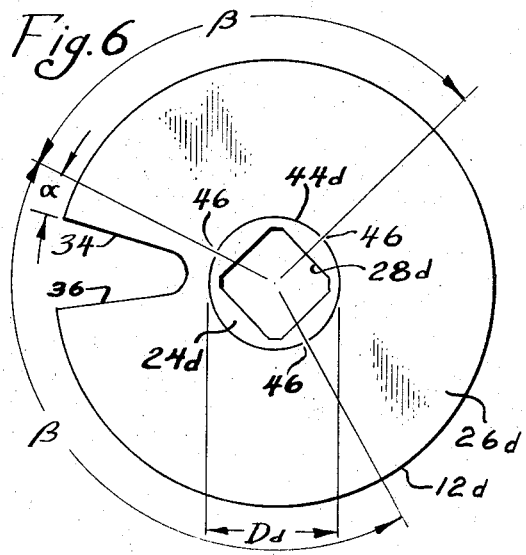
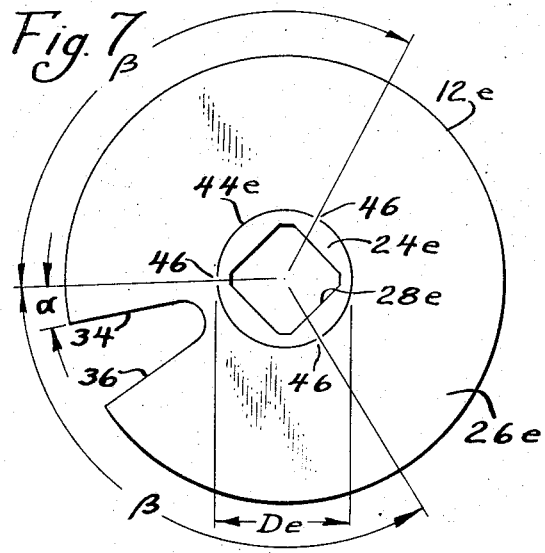
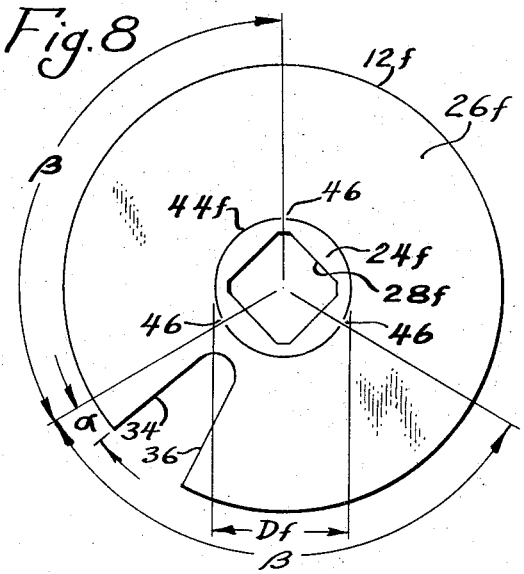

MULTIPLE DAY RECORDING CHART PACK

BACKGROUND OF THE INVENTION

The present invention relates generally to recording chart packs for tachographs and the like, and more particularly, to a novel multiple day chart pack having means for establishing substantially equal tie servering torque requirements between successive charts, and having means to prevent restraint of movement of the charts to inoperative positions after recording thereon.

It is a conventional practice to employ graphical recording devices, such as tachographs, on motor vehicles for recording the distance traveled by the vehicle during a given period of time, the time period between vehicle movement, the speed of the vehicle, and other parameters. Such tachographs generally include recording means responsive to variations in the parameters being recorded to graphically record data on recording charts which are rotatably driven by a clock motor mechanism. The recording charts are commonly assembled in pack form to provide a plurality of stacked charts which allow recording on each successive chart for a predetermined period of time, such as one day of recording for each chart.

It is known to employ chart packs with tachometers wherein each chart has a generally radial slot therein which allows the recording stylus to continue recording on the next successive chart in the stack after completion of recording on a first chart. The recording charts include inner and outer disc portions, with the inner disc portions being detachably secured to the outer disc portions through breakable ties spaced about the tie circles of the inner discs. Upon completion of recording on a chart in the pack, the completed chart is prevented from further rotation with the remaining pack and is thereby caused to be severed from its corresponding inner disc portion. The severed chart is then maintained in a generally fixed storage position while the remaining charts in the pack continue rotation until recording on the last of the charts has been completed.

While the known multiple day chart packs of the aforedescribed type have advanced the state of the art, they have not proven to be completely satisfactory for a number of reasons. Firstly, it has been found that the torque requirements for severing successive charts from their inner disc portions after completion of recording thereon varies substantially between successive charts in the stack. This variance in tie servering torque requirements results from the fact that the breakable ties in the known chart packs are identically positioned on each chart relative to the mounting openings in the inner disc portions of the charts. The positions of the breakable ties in each chart relative to the leading edge of the associated radial slot thus vary between successive charts. With the leading edge of radial slot in a chart engaging a stop member after completion of a recording cycle such that continued rotation of the corresponding center disc portion severs the associated connecting ties, it will be understood that varying the positions of the ties in successive charts relative to the leading edges of their respective slots will vary the torque required to sever the ties of successive charts. Such variance in severing torque requirements of the known chart packs adversely affects their use with conventional tachographs by demanding a greater range of torque output from the chart drive to the tachograph than is economically feasible to provide. If the torque requirements for severing successive charts from their respective inner disc portions is greater than the torque which can be supplied by the tachograph drive means, the escapement mechanism of the tachograph will "underbank" with a resulting time slowdown of the chart drive means. If the tie severing torque required is substantially less than the torque range provided for by the tachograph drive means, conventionally a mainspring mechanism, the escapement mechanism will "overbank" and the timer drive speed will be increased. There thus exists a need for a recording chart pack wherein the tie severing torque requirements between successive charts are substantially equal, and wherein the tendency of the charts to buckle as they are severed from their inner disc portions is eliminated.

In addition to the above drawback in the known multiple day chart packs, it has been found that movement of successive completed recording charts to inoperative positions is substantially restrained, thereby further increasing the torque requirements of the associated tachographs and resulting in inefficient operation of the tachographs. This restraint derives from recording chart manufacturing techniques wherein a plurality of recording charts are printed simultaneously and have their center noncircular openings formed therein in a first operation. The outer circular peripheries of the charts, the radial slots or windows, and the tie circles and connecting ties are then formed simultaneously in a second operation. With such manufacturing techniques, the tie circle diameters defining the inner disc portions may vary considerably between recording charts due to expansion of the chart material during stamping and also due to dimensional variations between the cutting dies resulting from normal tolerance variations. In the prior art recording chart packs, the tie circles defining the inner disc portions were intended to have substantially identical diameters. However, due to the above noted variances in diameters of the tie circles, boundary restrictions were found to exist resulting from overlap of eccentric portions of inner disc portions of the charts onto the outer chart portions of the succeeding recording charts. Such boundary restraints prevent unobstructed movement of the recorded charts to inoperative positions spaced slightly above the unrecorded rotating charts. A further need thus exists for an improved chart pack which allows unobstructed movement of recording charts to inoperative positions after completion of recording thereon. These needs are met by the present invention.

SUMMARY OF THE INVENTION

One of the primary objects of the present invention is to provide an improved recording chart pack for use with tachographs and the like wherein the tie severing torque required for successive charts is substantially equal.

Another object of the present invention is to provide an improved recording chart stack wherein each chart has an inner disc portion detachably secured to an outer disc portion through three substantially equidistantly spaced ties disposed on a tie circle, the ties on each of the stacked recording charts being identically positioned relative to the leading edges of the associated chart slot as the ties of the remaining charts in the pack.

Another object of the present invention is to provide a recording chart pack wherein, in addition to providing uniform tie severing torque requirements between successive charts, the ties are positioned to prevent buckling of the charts as they are severed from their associated inner disc portions.

Still another object of the present invention is to provide a multiple day recording chart pack comprising a plurality of recording charts each of which includes inner and outer disc portions, the inner disc portion of each chart being defined by tie circles having a diameter greater than the diameter of the tie circle of the next preceding chart in the stack to preclude restraint of movement of completed charts to inoperative positions.

In carrying out the objects and advantages of my present invention, I provide a recording chart pack having a stack of recording charts each of which includes inner and outer disc portions. The inner disc portions are defined by tie circles and are secured to their corresponding outer disc portions through breakable ties. Each chart except the bottom chart in the stack has a generally radial slot therein defined by leading and trailing edges, the slots allowing engagement of recording stylus means with successive recording charts in the pack. The ties of each chart are generally equidistantly spaced about the tie circle with one tie being positioned in trailing relation to the leading edge of the corresponding chart slot by an angle of preferably about 10°. The ties of each chart in a pack are substantially identically positioned relative to the leading edge of the corresponding radial slot as the ties of the other charts in the pack so as to require generally equal tie severing torque to sever the successive charts from their associated inner disc portions. By so positioning the ties of each of the recording charts, the tendency of the charts to buckle during severing is substantially eliminated. The tie circle diameter of each recording chart in a pack is greater than the diameter of the tie circle of the next preceding chart by an amount sufficient to prevent interference or restraint of movement of each chart to an inoperative position as it is severed from its corresponding inner disc portion after recording thereon.

Further objects and advantages of the present invention, together with the organization and manner of operation thereof, may best be understood from the following detailed description of a preferred embodiment of the invention when taken in conjunction with the accompanying drawings wherein like reference numerals designate like parts throughout the several views.

BRIEF DESCRIPTION OF THE DRAWINGS

FIGS. 3 – 8 are detail plan views of the first through the sixth recording charts of the seven day recording chart stack illustrated in FIG. 1, showing the location of the connecting ties relative to the leading edge of the radial slot of each of the charts.

DESCRIPTION OF A PREFERRED EMBODIMENT

Figure 1:
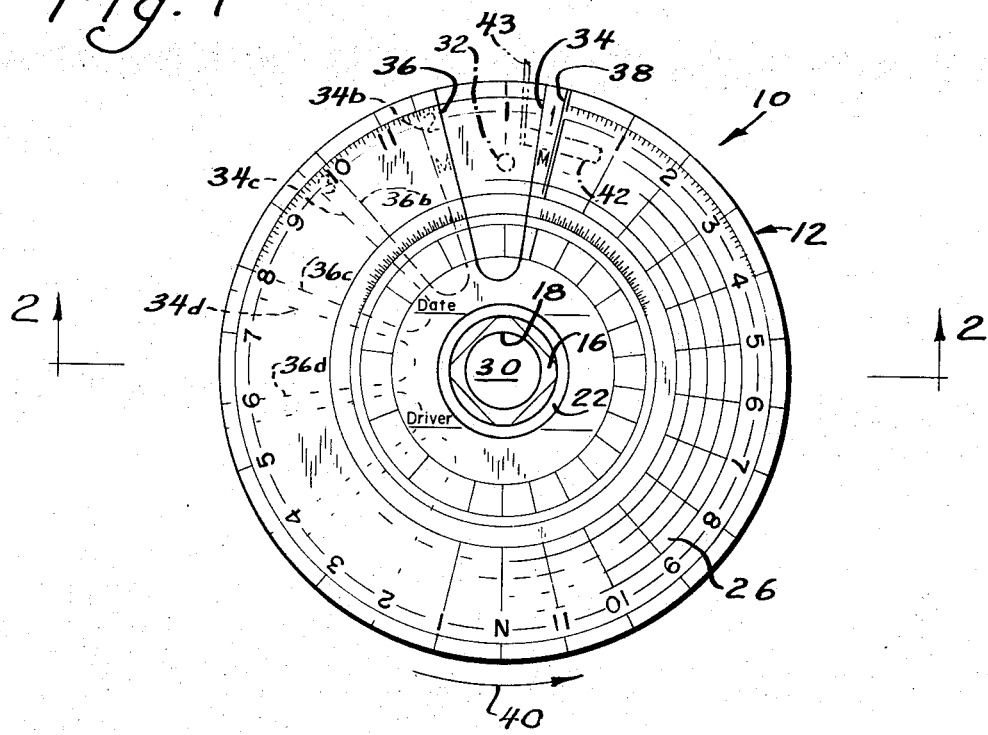
FIG. 1 is a plan view of a multiple day recording chart pack in accordance with a preferred embodiment of the present invention.
Figure 2:
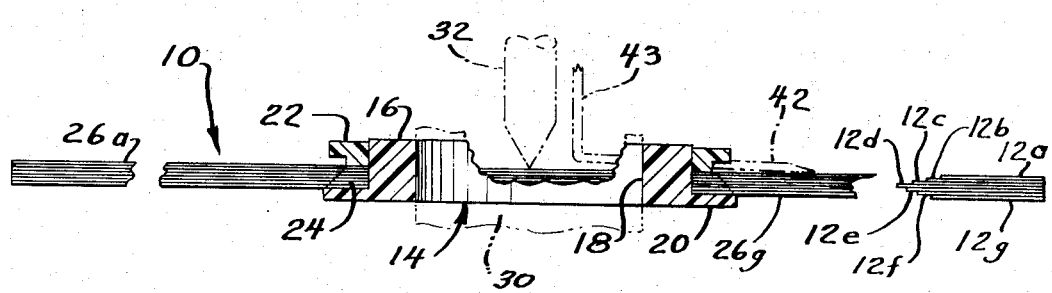
FIG. 2 is a vertical sectional view taken substantially along line 2—2 of FIG. 1.

Referring now to the drawings, and in particular to FIGS. 1 and 2, a preferred embodiment of a multiple day recorder chart pack in accordance with the present invention is indicated generally at 10. As will be explained more fully below, the chart pack 10 finds application in tachographs and the like as used for recording selected data of moving vehicles, such as vehicle speed, etc., in relation to time. The chart pack 10 comprises a plurality of recording charts 12, there being seven recording charts shown in the illustrated embodiment to comprise a "seven-day" chart pack. For clarification in the following description, the charts 12 of the chart pack 10 will be referred to as charts 12a–g to indicate the progressive order of the stacked charts from the uppermost chart 12a to the lowermost or seventh day chart 12g.

Each of the charts 12a – 12g may be made of paper or other suitable material, as is known, and includes an upper pressure sensitive recording surface having a printed format thereon suitable to graphically record the particular parameters being recorded, such as vehicle speed. The charts 12a–g are circular in plan configuration and are maintained in stacked axial alignment by support hub means indicated generally at 14. The support hub means 14 includes a support boss portion 16 having a cylindrical bore 18 axially therethrough and having an annular flange portion 20 preferably formed integral with the lower end of the boss 16 for engagement with the lower surface of the lowermost recording chart 12g. The outer peripheral surface of the support boss 16 is polygonal in shape, considered in a plane transverse to the axis of the bore 18, and may comprise a generally hexagon shape as shown in FIG. 1. As will become more apparent hereinbelow, the polygonal outer peripheral configuration of the support boss 16 of the support hub means 14 provides a secure connection between the hub means and the stacked charts 12a–g thereon during operation of the tachograph on which the chart pack 10 is employed. The end of the support boss 16 opposite the annular flange 20 releasibly receives an annular retaining ring 22 thereon through an interference fit. In this manner, a plurality of recording charts 12 may be stacked on the support boss portion 16 of the support hub means 14, and the retainer ring 22 thereafter pressed onto the upper end of the support boss to firmly retain the stacked charts against the lower annular flange 20.

Noting FIGS. 3–8, taken in conjunction with FIGS. 1 and 2, each of the recording charts 12a–g includes an inner disc portion 24 and an outer annular portion 26 concentric with the axis of the corresponding inner disc portion. The outer chart portion 26 of each recording chart preferably has appropriate recording indicia printed thereon consistent with the nature of the data being recorded. Each of the inner disc portions 24a–24g has an axial polygonal shaped opening therethrough providing a mating configuration with the outer peripheral surface of the support boss 16 of the support hub means 14 to provide a non-rotating connection to the support hub means when the recording charts are mounted thereon in stacked relation. The non-circular configuration of the outer periphery of the support boss 16 and the corresponding configurations of the axial openings 28 provide a reference registration for the charts when received on the support hub means as will become more apparent hereinbelow.

The non-rotatable mounting of the charts 12 on the support hub means 14 provides means for effecting rotational movement of the stack of recording charts about the central axis of the support boss 16 through rotation of the support hub means. Tachographs of the type with which the chart pack 10 may be employed conventionally include motor means (not shown) to effect rotational movement of a support shaft, shown in FIG. 1 in phantom at 30, upon which the support hub means 14 of the chart pack is secured for conjoint rotation therewith. The motor means of the tachograph may comprise a clock drive adapted to effect rotational movement of the chart pack 10 in predetermined speed relation, such as approximately one revolution per day. Such tachographs further conventionally include at least one stylus, indicated in phantom at 32, which is movable generally radially of the axis of the chart pack 10 and is adapted for engagement with the upper pressure sensitive surfaces of the uppermost chart and successive charts to chart a graph on the recorder chart surfaces in polar coordinates in a known manner.

Each of the charts 12 in the pack 10, except the lowermost chart 12g, has a substantially radially disposed slot in its outer annular portion 26, each slot being defined by a leading edge 34 and a trailing edge 36 radial to the axis of rotation of the charts. Each of the recorder charts 12 further includes a record start or reference line, such as shown at 38 in FIG. 1, which is located slightly angularly rearwardly of the leading edge 34 of the corresponding chart slot to establish a reference line defining the beginning of the chart area engaged by the stylus 32 during a recording operation. It will be understood that the tachograph drive means (not shown) is operative to rotate the drive shaft 30 and any associated turntable to effect rotational movement of the recording chart pack 10 through an arcuate angle extending from the reference line 38 to the trailing edge 36 of each of the charts for each predetermined time period, the charts being caused to rotate in the direction of arrow 40 relative to the stylus 32, as shown in FIG. 1.

Preferably, the portion of each chart 12 between the leading edge 34 of the corresponding slot and the initial starting or reference line 38 is raised slightly to insure insertion and receipt thereunder of a conventional chart separating finger, such as shown in phantom at 42 in FIGS. 1 and 2, which is secured to a stop member 43 on the associated tachograph. The radial slots in the charts 12a-f are positioned relative to their respective center openings 28 so that when the charts are assembled on the hubs means 14, the slots are angularly displaced at regular equal intervals between successive charts with the trailing edge 36 of each slot overlying the reference line 38 of the next lower chart. During rotation of the chart pack, the separating finger 42 is caused to be received beneath the leading edge of a chart after completion of recording thereon whereupon the leading edge 34 of such chart engages the stop member 43 to prevent further rotational movement of such chart as is known. In this manner, upon completion of one arcuate cycle of a chart upon which the stylus 32 is recording, the stylus will move directly onto the recording portion of the next succeeding chart without interruption in the recorded data.

With reference to FIGS. 3-8, each of the inner disc portions 24a-f of the charts 12a-f is defined by a tie circle 44a-f respectively. The tie circles 44 are formed by a forming die which substantially severs through the chart material except for a plurality of breakable connecting ties 46 in each chart which serve to detachably secure each inner disc portion 24 to its corresponding outer chart portion 26. As the charts having such breakable ties engage the stop member 43 at the end of a recording cycle so that further rotation of the outer chart portion 26 is prevented, the ties 46 sever to allow continued rotation of the corresponding inner disc portion with the remaining unrecorded charts in the pack. The separating finger 42 then separates the severed recorded chart from the remaining charts in the pack and effectively moves it to an inoperative position. It has been a practice in prior recording charts to employ a plurality of breakable ties, such as four in number, equidistantly spaced about a circular score line or tie circle defining the inner disc portion of each chart. These prior charts position the breakable ties relative to the polygonal shaped opening in the inner disc portion of each chart so that the ties of each chart in a pack are in identical position relative to the center opening as the ties of the other charts in the pack. With each chart having a radial slot, and with the radial slots of successive stacked charts being angularly staggered relative to the slots of the other charts, the positions of the breakable ties on each prior chart relative to the leading edge of the corresponding radial slot or window vary between successive charts. It has been found that with the positions of the breakable ties on successive charts varying relative to the leading edges of the corresponding slots, the torque requirements for severing the breakable ties vary between successive charts during a multiple day recording period. In addition, with the manner of positioning the ties in the prior recording charts, a connecting tie would often be positioned angularly forwardly of the leading edge defining the associated radial slot in the chart by a lead angle of 2° to 10°. When charts having the latter tie positions are engaged by the stop member 43 at the end of a recording cycle, it was found that the charts tend to buckle.

In accordance with a preferred embodiment of the present invention, three breakable ties 46 are provided on each recording chart 12 to detachably secure the inner disc portion 24 of the chart to its outer annular portion 26. The ties 46 of each chart are positioned in predetermined relation to the leading edge 34 of the corresponding radial slot so that the torque requirements of the tachograph motor required to effect severing of the connecting ties are substantially equal between successive charts in a multiple day chart pack. The ties 46 of each of the charts 12a-12f in the chart pack 10 are preferably substantially equidistantly circumferentially spaced about the corresponding tie circle 44 so as to be angularly separated by approximately 120°.

In accordance with the preferred embodiment of the present invention, one of the three breakable connecting ties 46 of each recording chart 12 is positioned angularly rearwardly of or in trailing relation to the leading edge 34 of the corresponding radial slot therein by an angle alpha of approximately 10°. With one of the breakable ties 46 being so positioned relative to the leading edte 34 of the corresponding slot, the remaining two breakable ties are spaced from the first selectively positioned tie by substantially equal arcuate angles beta of approximately 120°. In this fashion, the breakable ties 46 of each chart 12 will be substantially identically positioned relative to the leading edge of the radial slot therein, when considered through successive charts in the chart pack 10. As the separating finger 34 is received under the raised leading edge portion of a chart, the leading edge abuts the stop member 43 after completion of a recording cycle and the torque required to break or sever the ties 46 connecting the recorded chart portion 26 to its inner disc portion 24 will be substantially equal to the tie severing torque required for successive charts in the stack.

It has been found that when employing octagon shaped openings 28 in the inner disc portions 24 of the charts 12, as shown in FIGS. 3–8, it may be desirable to vary the above described angular relationship of the ties 46 relative to the leading edge 34 of a chart radial slot. For example, in one embodiment of the chart pack 10, it was found desirable in the second chart of the stack to make the angular relation alpha approximately 2+ between the breakable tie adjacent the leading edge 34 of corresponding radial slot to preclude formation of a weak area between the tie and the adjacent edge portion of the octagon shaped opening in the center disc portion 24b. Similarly, it may be necessary to vary the angular relation beta between the spaced ties 46 of a chart 12 slightly from the preferred 120 degree angular spacing in order to prevent any of the ties from being positioned adjacent a corner of the corresponding octagon shaped opening 28. In one constructed embodiment of the chart pack 10, the angles beta between ties 46 in the first four charts of the stack varied from 105° to 145° in order to prevent a tie 46 from being positioned close to a corner of the corresponding octagonal opening 28 and forming a weak area which might tend to break during assembly of the chart onto the mounting hub boss 16. It will be understood that by varying the polygonal configuration of the center disc openings 28 and the outer polygonal configuration of the support boss 16 of the support hub means 14 to prevent relatively thin areas between the center openings and the tie circles, the ties of each of the charts in a stack relative to the leading edge of their corresponding radial slot could be positioned identically throughout the complete stack.

As described above, one drawback in the prior art recordings chart packs lies in the provision of substantially equal diameter tie circles between successive charts. Due to normal manufacturing tolerance variances in forming the score-lines or tie circles which define the inner disc portions of the charts, it was found that an eccentric inner disc portion could overlie the outer recording chart portion 26 of a succeeding chart and thereby restrain and substantially inhibit movement of the successive outer recorded chart portions axially over the center disc portions severed from the preceding charts.

In accordance with the present invention, such overlap or "boundary restriction" as heretofore encountered is eliminated by making the diameter of each tie circle 44 slightly greater than the diameter of the tie circle of the next preceding recording chart. With reference to FIGS. 3–8, the diameter Da of the inner disc portion 24a of chart 12a would be provided with a predetermined diameter. The diameter Db of the charts 12b would than be made greater than the tie diameter Da of chart 12a to insure that after severing of the outer chart portion 26b of chart 12b from its associated inner disc portion 24b, the outer chart portion 26b will pass axially upwardly over the inner disc portion 24a retained on the support boss 16 of the support hub means 14. Similarly, the diameter Dc, Dd, De and Df are made greater than the diameter of the tie circle of the next preceding recording chart. It has been found that making each tie circle diameter greater than the tie circle diameter of the next preceding chart by approximately 0.015 inch will eliminate "boundary restrictions" as above described and allow free upward movement of each of the recorded outer chart portions 26 axially over the severed center disc portions 24 of the preceding recording charts in the stack.

In accordance with the above described embodiment of the present invention, it has been found that the torque required to effect severing of the inner disc chart portions 24 from their associated outer chart portions 26 is substantially equal between successive charts in a chart pack. This allows selection of a tachograph timing device mechanism or escapement which will operate within a relatively narrow range of torques, thus allowing more accurate drive of the rotary timing mechanism. In addition, by making the tie circle diameter of each chart slightly greater than the diameter of the tie circle of the next preceding chart, boundary restrictions are eliminated which further serves to eliminate variances in torque requirements necessary to continue rotation of the recording chart stack after severing a completed recording chart from its corresponding inner disc portion. Moreover, by insuring that one tie of three angularly equidistantly spaced ties on each of the recording charts is placed angularly rearwardly of or in trailing relation from the leading edge of the corresponding radial slot of the recording chart, buckling is precluded.

While a preferred embodiment of the present invention has been shown and described, it will be understood to those skilled in the art that changes and modifications may be made therein without departing from the invention in its broader aspects.

I claim:

1. A multiple day chart pack for use with tachographs and the like, comprising, a plurality of charts supported in stacked relation for rotation about a common axis, each of said charts having an outer portion and an inner disc portion, each outer portion having a generally radially disposed slot therein defined by leading and trailing edges, each inner disc portion including means for securing the corresponding chart to rotary drive means and being detachably secured to its corresponding outer chart portion through at least one breakable tie located in predetermined relation to the leading edge of the corresponding slot, the ties of each chart in the pack being located in substantially identical position relative to the leading edge of the slot on its chart as the ties of each of the other of said charts have to the leading edge of the slot on their chart so that the torque required to sever the ties of each chart is substantially equal throughout the stack.

2. A chart pack as defined in claim 1 wherein said inner disc portions of said charts are detachably secured to their corresponding outer chart portions through three ties spaced substantially equidistantly about said inner disc portions, one of said ties on each chart being positioned generally adjacent but trailing the leading edge of the corresponding slot therein.

3. A chart pack as defined in claim 2 wherein each of said ties positioned generally adjacent the leading edge of said corresponding slot lies on the radius of the leading edge or on a radius which trails the leading edge by an angle of up to approximately 10°.

4. A chart pack as defined in claim 1 wherein said outer portion of each of said charts is concentric with its corresponding inner disc portion, and wherein said means for securing each of said charts to rotary drive means comprises a polygonal shaped opening provided centrally in each of said inner disc portions.

5. A chart pack as defined in claim 4 including a mounting hub having an outer polygonal configuration similar to said polygonal shaped openings in said inner disc portions and received axially through said inner disc portions.

6. A chart pack as defined in claim 1 wherein said charts include upper recording surfaces and are supported in stacked relation with the trailing edge of each slot overlying a starting reference line of the recording surface on the next succeeding lower chart.

7. A day chart pack for use with tachographs and the like containing a plurality of charts supported in stacked relation for rotation about a common axis, each of said charts having an outer portion and an inner disc portion, each outer portion having a generally radially disposed slot therein defined by leading and trailing edges, each inner disc portion including means for securing the corresponding chart to rotary drive means and being defined by a tie circle, the diameter of each tie circle being greater than the diameter of the the circle of the preceding chart, when considered from the uppermost chart to the lowermost chart of the stack of charts, the ties of each chart in the pack being located in substantially identical position relative to the leading edge of the slot on its chart as the ties of each of the other of said charts have to the leading edge of the slot on their chart so that the torque required to sever the ties of each chart is substantially equal through the stack.

8. A chart pack as defined in claim 7 wherein each tie circle diameter is greater than the tie circle diameter of the next preceding chart by an amount sufficient to allow the outer portion of each chart to pass axially over the inner disc portions of the preceding charts in the stack after severing of the outer chart portions of the preceding charts from their corresponding inner disc portions.

9. A chart pack as defined in claim 7 wherein the tie circle diameter of each successive chart is greater than the tie circle diameter of the next preceding chart by approximately 0.015 inch.

10. A multiple day chart pack for use with tachographs and the like, comprising a plurality of charts supported in stacked relation for rotation about a common axis, each of said charts having an outer portion and an inner disc portion, each of said inner disc portions being defined by a tie circle and being detachably secured to its corresponding outer chart portion by connecting means disposed on its tie circle, the tie circle of each of said inner disc portions having a diameter greater than the diameter of the tie circle of the next preceding chart in the stack.

11. A chart pack as defined in claim 10 wherein each tie circle diameter is greater than the tie circle diameter of the next preceding chart by an amount sufficient to allow the outer portion of each chart to pass axially over the inner disc portions of the preceding charts in the stack after severing of the outer portions of the preceding charts from their corresponding inner disc portions.

12. A chart pack as defined in claim 10 wherein the tie circle diameter of each successive chart is greater than the tie circle diameter of the next preceding chart by approximately 0.015 inch.

13. A chart pack as defined in claim 10 wherein said connecting means comprises at least one breakable tie.

14. A chart pack as defined in claim 10 wherein said connecting means comprise three breakable ties for each of said charts, said ties being generally equidistantly spaced about the circumference of their corresponding tie circle.

15. A chart pack as defined in claim 14 wherein said ties are formed integral with said inner and outer chart portions.

* * * * *